US011319715B2

(12) United States Patent
Lindyberg et al.

(10) Patent No.: US 11,319,715 B2
(45) Date of Patent: May 3, 2022

(54) METHOD OF DE-TENSIONING A ROD

(71) Applicant: FDH Services, Inc., Raleigh, NC (US)

(72) Inventors: Robert Lindyberg, Raleigh, NC (US);
Rakesh Khan, Wake Forest, NC (US);
Afshin Karshenas, Raleigh, NC (US);
Brennon Fuqua, Raleigh, NC (US);
Travis Ferguson, Raleigh, NC (US)

(73) Assignee: FDH INFRASTRUCTURE SERVICES, LLC, Raleigh, NC (US)

( * ) Notice: Subject to any disclaimer, the term of this patent is extended or adjusted under 35 U.S.C. 154(b) by 63 days.

(21) Appl. No.: 16/930,402

(22) Filed: Jul. 16, 2020

(65) Prior Publication Data
US 2020/0347621 A1 Nov. 5, 2020

Related U.S. Application Data

(62) Division of application No. 15/590,490, filed on May 9, 2017, now Pat. No. 10,753,111.

(60) Provisional application No. 62/335,362, filed on May 12, 2016.

(51) Int. Cl.
*E04C 5/12* (2006.01)
*E04G 21/12* (2006.01)
*G01L 5/04* (2006.01)

(52) U.S. Cl.
CPC ............ *E04G 21/121* (2013.01); *E04C 5/122* (2013.01); *G01L 5/042* (2013.01)

(58) Field of Classification Search
CPC ........ E04G 21/121; E04C 5/122; G01L 5/042
See application file for complete search history.

(56) References Cited

U.S. PATENT DOCUMENTS

| 2,761,649 A | 9/1956 | Woolcock |
| 2,886,875 A | 5/1959 | Anderson |
| 3,022,713 A | 2/1962 | Friberg |
| 3,703,030 A | 11/1972 | Simms |

(Continued)

FOREIGN PATENT DOCUMENTS

| GB | 692354 | 6/1953 |
| GB | 1038899 | 8/1996 |

(Continued)

OTHER PUBLICATIONS

International Search Report dated Aug. 21, 2017 issued in connection with PCT/US2017/031761; 3 pages.

(Continued)

*Primary Examiner* — Rick K Chang
(74) *Attorney, Agent, or Firm* — Vedder Price P.C.

(57) ABSTRACT

A method of de-tensioning a rod by attaching a gripping unit removal device to a gripping unit and rod, positioning a chair frame over the gripping unit, positioning a rod tensioning unit along the rod with one end of the rod tensioning unit being in contact with the chair frame, applying a first force to the rod tensioning unit, positioning a bearing plate on the rod in contact with the rod tensioning unit, positioning a load cell in contact with the rod on the rod tensioning unit, securing a drive unit to the chair frame such that a portion of the drive unit is in contact with the rod, applying a second pressure to the rod tensioning unit, actuating the drive unit, and releasing the second pressure on the rod tensioning unit.

10 Claims, 6 Drawing Sheets

(56) References Cited

U.S. PATENT DOCUMENTS

| | | | |
|---|---|---|---|
| 4,302,979 A * | 12/1981 | Dykmans | G01N 3/06 |
| | | | 254/29 A |
| 4,307,550 A | 12/1981 | Behar | |
| 4,744,691 A * | 5/1988 | Thal | E04C 5/122 |
| | | | 24/136 R |
| 4,862,576 A * | 9/1989 | Lu | E02D 5/80 |
| | | | 29/452 |
| 5,802,788 A * | 9/1998 | Ozawa | E04C 5/122 |
| | | | 24/122.6 |
| 6,055,691 A | 5/2000 | Nutzel et al. | |
| 6,470,636 B1 | 10/2002 | Rose | |
| 7,033,116 B1 | 4/2006 | Ward et al. | |
| 7,313,975 B1 | 1/2008 | Scorteanu | |
| 2007/0175128 A1 | 8/2007 | McCallion | |
| 2008/0302035 A1 | 12/2008 | Shin | |
| 2010/0181699 A1 | 7/2010 | Freudenstein et al. | |

FOREIGN PATENT DOCUMENTS

| | | |
|---|---|---|
| JP | 2011075277 A | 4/2011 |
| WO | 9629500 | 9/1996 |

OTHER PUBLICATIONS

International Written Opinion dated Aug. 21, 2017 issued in connection with PCT/US2017/031761; 11 pages.
Preliminary Report on Patentability dated Nov. 3, 2018 filed in PCT/US2017/031761; 12 pages.

* cited by examiner

METHOD OF DE-TENSIONING A ROD

CROSS-REFERENCE TO RELATED APPLICATIONS

This application is a divisional of U.S. Non-Provisional patent application Ser. No. 15/590,490, entitled "ROD DE-TENSIONING DEVICE" filed on May 9, 2017, which claims priority to U.S. Provisional Patent App. No. 62/335,362, entitled "ROD DE-TENSIONING DEVICE AND METHODS OF OPERATING THE SAME" filed on May 12, 2016, which is incorporated by reference herein in its entirety.

BACKGROUND OF THE INVENTION

Post-tensioned trunnion anchor rods are used to secure large devices, such as gates on dams, to structures. To firmly secure the devices to the structure, tension is applied to the trunnion rods, and the individual rods are locked off to maintain the tension load within the rod. See, U.S. Pat. No. 2,705,871 to Kenigsberg and U.S. Pat. No. 2,871,664 to Dobson. For large structures, such as dams, a large amount of tension (typically 60% or more of its ultimate strength) is applied to the rods creating a potentially dangerous situation. At least 100-200 dams in the United States use post-tensioned trunnion rods for gate anchorages. Trunnion rods are predominately made of metal that is designed to operate at a specific tension level. Increased tension, in addition to long-term environmental stresses in the rods creates a dangerous situation where the rods may fail in a brittle and abrupt manner before the end of life expectancy date.

Since 1960 many dams were built using post-tensioned trunnion rods. At the time the dams were erected, and until 2010, cost-effective and safe technology to determine the amount of tension in each rod was not available, and premature rod failures due to over-tensioning have occurred on several dams since the 1970s. Because of the importance of these trunnion rods, and the aging of the inventory of rods currently in dams, dam owners and operators are beginning to regularly test the tension in each rod and the integrity of the rods using recently-developed non-destructive techniques that are safe and cost efficient.

However, even with the testing, there is currently no safe or efficient procedure to remove excess tension in trunnion rods. In a dam environment, an abrupt failure of a post-tensioned trunnion rod can result in the trunnion rod being expelled from the dam at high rate of speed. Further, the costs involved with removing and replacing trunnion rods, or otherwise reinforcing gate anchorages on dams are very high. Therefore, a need exists for a method of removing excess tension from post-tensioned trunnion rods to increase the useful life of installed trunnion rods.

BRIEF SUMMARY OF THE INVENTION

One embodiment of the present disclosure includes a rod detensioning unit including a gripping unit removal device that engages a gripping unit on a rod, a chair frame configured to engage a rod, a rod tensioning unit that applies tension to an external portion of the rod to remove load from the gripping unit, a load cell unit that measures a tension level applied to the rod by the tensioning unit, a plate gripping unit that engages the rod and secures the chair frame, rod tensioning unit, load cell and plate gripping unit to the rod, a drive unit that engages the gripping unit removal device, and an extension unit affixed to the external portion of the rod when the original external rod length is too short to accommodate the de-tensioning unit.

In another embodiment, the gripping unit includes an opening sized to accommodate the rod.

In another embodiment, the opening has an inner surface that includes a plurality of threads.

In another embodiment, the rod detensioning unit includes a second gripping unit that is in the opening of the gripping unit.

In another embodiment, the second gripping unit includes a plurality of threads that correspond to the threads in the opening.

In another embodiment, the second gripping unit is positioned in the opening a predetermined distance from a trunnion.

In another embodiment, the rod tensioning unit is hydraulically driven.

In another embodiment, the rod detensioning unit includes a central control unit communicatively coupled to the drive unit.

In another embodiment, the rod detensioning unit includes a plurality of cameras optically coupled to the central control unit.

In another embodiment, at least one camera is positioned to capture an image of a side of the gripping unit.

Another embodiment of the present disclosure includes a method of detensioning a rod, the method including removably attaching a gripping unit removal device on a gripping unit where the gripping unit engages a rod, positioning a chair frame on the rod over a periphery of the gripping unit, positioning a rod tensioning unit on the rod with a first end of the rod tensioning unit being in contact with a surface of the chair frame, applying a first force to the rod tensioning unit, positioning a bearing plate on the rod in contact with the rod tensioning unit, positioning a load cell in contact with the rod on the rod tensioning unit, securing a drive unit to the chair frame such that a portion of the drive unit is in contact with the rod, applying a second pressure is applied to the rod tensioning unit, actuating the drive unit, and releasing the second pressure on the rod tensioning unit.

In another embodiment, the first pressure is sufficient to increase the tension in the rod.

In another embodiment, the second pressure is sufficient to separate the gripping unit from a trunnion.

In another embodiment, the driving unit includes a engagement portion that is in contact with the rod.

In another embodiment, the drive unit actuates to move the gripping unit a predetermined distance from the trunnion.

In another embodiment, the drive unit is electrically driven.

In another embodiment, the method includes the step of connecting a central control unit communicatively coupled to the drive unit.

In another embodiment, the method includes the step of optically connecting a plurality of cameras to the central control unit.

In another embodiment, at least one camera is positioned to capture an image of a side of the gripping unit.

In another embodiment, the first pressure is less than the second pressure.

BRIEF DESCRIPTION OF THE SEVERAL VIEWS OF THE DRAWING

FIG. IA depicts a dam that includes a spillway defined between two piers.

DETAILED DESCRIPTION OF THE INVENTION

Figure 1A:
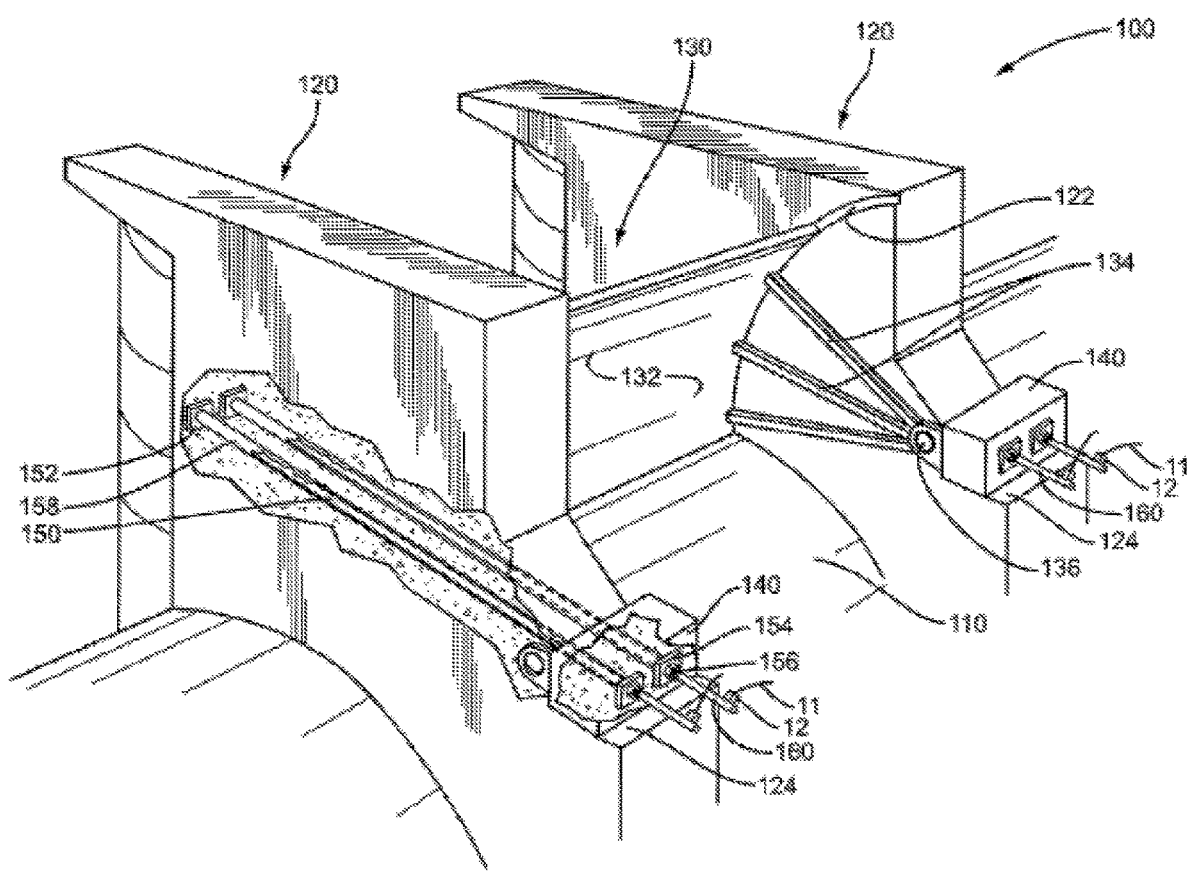
FIG. 1B depicts a trunnion rod system used to secure structures together.

FIG. 1A depicts a dam 100 that includes a spillway 110 defined between two piers 120. Mounted between piers 120 is Tainter gate 130 comprised of a curved panel 132 supported on radial arms 134. Radial arms 134 converge at trunnion pin 136 that is supported at a rotational pivot by trunnion girders 140. The trunnion girders 140 are separate from the piers 120 and are secured to the piers 120 by rods 150. Sides of curved panel 132 may slide through and engage with curved leak limiting slots 122 in side faces of piers 120. It is to be appreciated that a water reservoir is on the convex or upstream side of curved panel 132. When gate 130 is closed the panel is in the lower position as shown in FIG. 1A and water is prevented from flowing downstream over the dam by curved panel 132. When gate 130 is opened by rotating radial arm structure 134 about trunnion pin 136, water from the reservoir is permitted to flow under panel 132, over spillway 110, and downstream from dam 100.

Trunnion girders 140 may be vertically supported on ledges 124 that are formed on piers 120. Trunnion pins 136 are journaled in trunnion girders 140. Tension rods or anchorage tendons 150 extend in a generally upstream direction into piers 120 and are anchored in the piers by tendon anchorage plates or anchorage means 152 embedded in the concrete of the piers. Downstream ends of rods 150 are secured to trunnion girders 140 to prevent trunnion girder 140 from being pushed downstream by the water held back by gate 130. Rods 150 typically extend through trunnions 140 to facilitate securing the trunnion girder securely to the pier 120. A typical means of securement is provided by dry-mounted trunnion base plates 154 positioned on the downstream side of the trunnion girder. Rods 150 extend through openings in base plates 154 and gripping units 156 are tightened on the rods. In some cases, gripping units 156 are threaded and engage threaded portions of rods 150. In other cases gripping units 156 are of the so-called Howlett grip nut type, for connection to smooth rods. In any case, nuts 156 provide a secure connection of rods 150 to trunnion girders 140 such that the rod portions between trunnions 140 and anchorage means 152 are tensioned. An untensioned or free end portion 160 of each rod 150 extends downstream of each gripping unit 156.

Figure 1B:
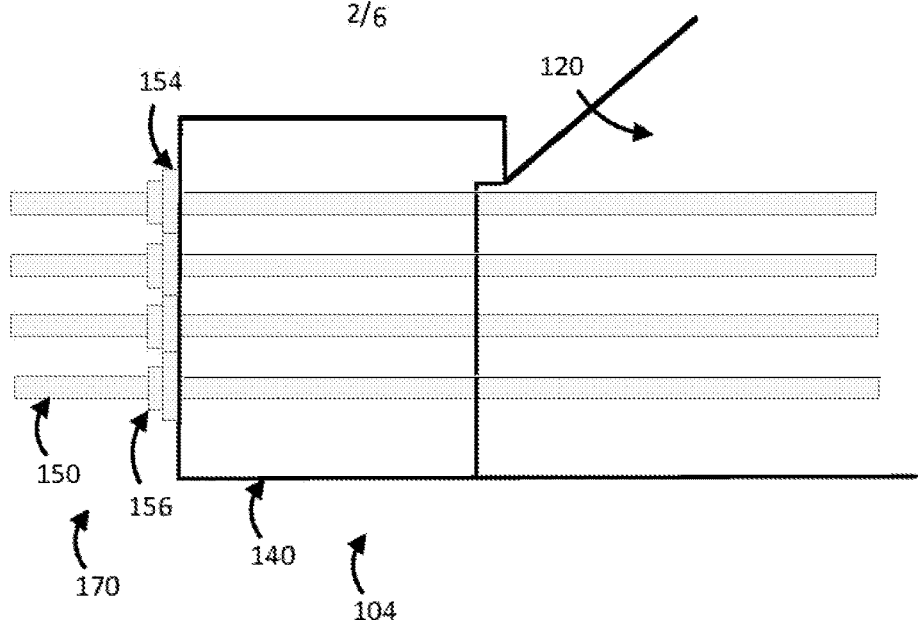

FIG. 1B depicts a trunnion rod system used to secure structures together. The trunnion rod system 100 includes a plurality of post-tensioned rods 150 extending through a trunnion girder 140 that apply uniform pressure to affix the trunnion girder to the pier 120 on a dam. The trunnion girder 140 is the support that holds that dam gates 130 in place, resisting gravity of hydrodynamic forces. The rods 150 are post-tensioned and "locked off" to maintain their tension to the trunnion girder 140 by gripping units 156. When the rods 150 are installed, they are pulled away from the trunnion girder 140, thereby applying a tensile force to the rod 150. As the tensile force is applied to the rod 150 the gripping unit 156 is slid down the rod 150 and tightened to secure the rod 150 to the trunnion 140 without releasing the tension in the rod 150.

Figure 2:
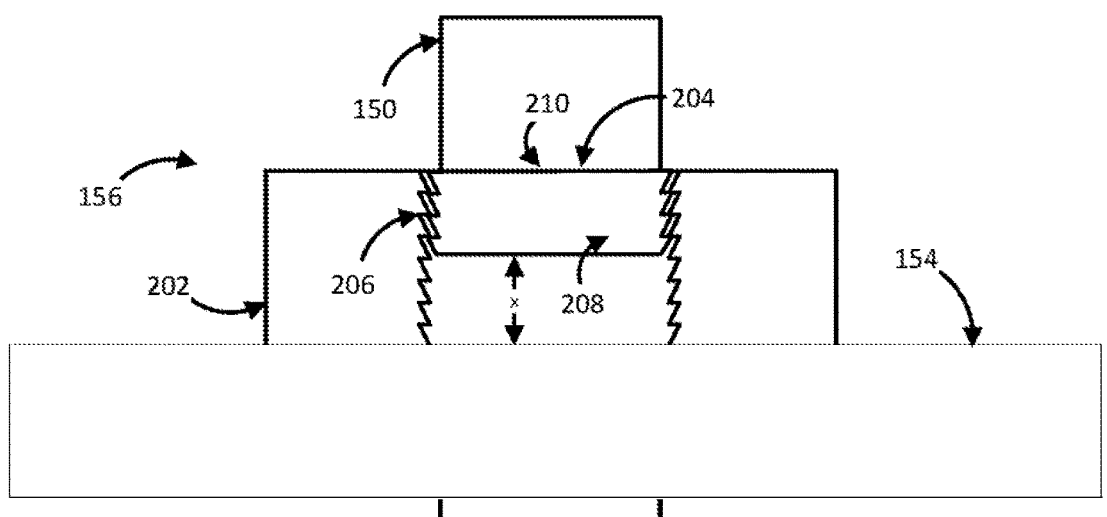
FIG. 2 depicts a gripping unit installed on a rod.

FIG. 2 depicts a gripping unit installed on a rod. The gripping unit 156 includes an outer portion 202 that has an opening 204 through the center of the outer portion 202. The opening 204 has a diameter larger than the diameter of the rod 150 such that the rod 150 can move freely through the opening 204. The inner surfaced of the opening 204 includes a plurality of threads 206. An inner gripping unit 208 includes threads corresponding to the threads 206 on the outer portion 202 of the gripping unit 156. The inner gripping unit 208 has a diameter equal to or slightly larger than the rod 150 such that the inner gripping unit 208 is secured to the rod 150 when the inner gripping unit 208 engages opening 204 of the outer portion 202. In one embodiment, the inner gripping unit 208 includes a slit (not shown) extending along one side of the inner gripping unit 208 to allow the diameter of the inner gripping unit 208 to compress when the inner gripping unit 208 is in the opening 204. In another embodiment, the opening 204 is tapered such that the diameter of the opening is larger where the rod 150 enters the gripping unit 156 and smaller where the rod 150 exits the gripping unit 156.

The inner gripping unit 208 has a height that is smaller than the height of the outer portion 202. The inner gripping unit 208 includes an opening 210 that is concentric with the opening 204 in the outer portion 202. The opening 210 is sized such that the rod 150 fits into the opening 210 when the inner gripping unit 208 is not inserted into the outer portion 202 and the inner gripping unit 208 compresses onto the rod 150 when the inner gripping unit 208 is threaded into the opening 204 in the outer portion 202 and tension is applied. When installed, the inner gripping unit 208 is positioned in the portion of the outer portion 202 that is farthest from the trunnion 140. A gap having a distance x is formed in the opening 204 below the inner gripping unit 208 in the opening 204. When installed, the outer portion 202 can rotate in relation to the inner gripping portion 208 when a rotative force is applied to the outer portion 202.

Figure 3:
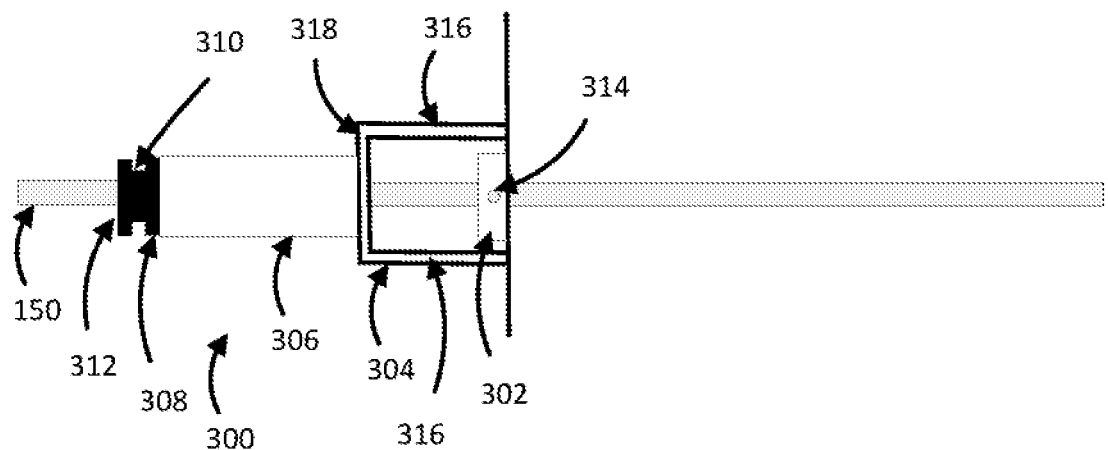
FIG. 3 depicts a rod de-tensioning device.

FIG. 3 depicts a rod de-tensioning device. The rod de-tensioning device 300 includes a gripping unit removal device 302, a chair frame 304, a rod tensioning unit 306, a bearing plate 308, a load cell unit 310 and a pulling gripping unit 312. The gripping unit removal device 302 includes an opening on an inner surface that engages the outer portion 202 of the gripping unit 156. The gripping unit removal device 302 may be secured to the gripping unit 156 using securing units 314 such as set screws. The chair frame 304 includes four legs 316 that are connected to a top plate 318 with the top plate 318 being parallel to a top surface of the gripping unit removal device 302. The top plate 318 includes an opening that is sized to accommodate the rod 150 such that the rod 150 passes through the opening. The rod tensioning unit 306 includes a central channel that allows the rod 150 to pass through the central channel. The rod tensioning unit 306 may be a hydraulic jack that grips the rod 150 and applies additional tension to the rod 150 or any other actuation device capable of applying a tensile force to the rod 150.

The bearing plate 308 includes an opening that allows the rod to slide through the bearing plate 308. The bearing plate 308 is positioned on a side of the rod tensioning unit 306 furthest from the chair frame 304. A load cell unit 310 is positioned on the bearing plate 308. The load cell 310 determines the amount of tension being applied to the rod 150 by the rod tensioning unit using known methods. A pulling gripping unit 312 is positioned on the load cell unit 310 and is secured to the rod 150. The load cell unit 310 may be any load cell sensor capable of measuring the tensile force in a rod including a load sensor or a strain sensor.

Figure 4:
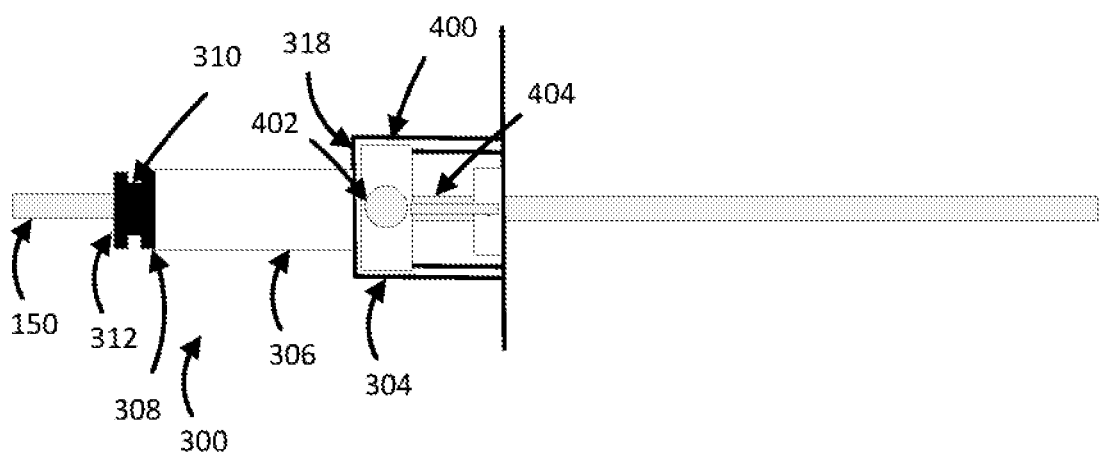
FIG. 4 depicts a drive unit 400 on the chair frame.

FIG. 4 depicts a drive unit 400 on the chair frame 304. The drive unit 400 includes a motor 402 with an engagement unit 404 connected to the motor 402. The engagement unit 404 is configured to engage the side surface of gripping unit removal device 302. When the motor 402 is energized, the engagement unit 404 rotates to loosen or tighten the gripping unit 156 via the gripping unit removal device 302. As the gripping unit 156 is loosened, the gripping unit 156 moves away from the surface of the trunnion 140 along the inner gripping unit 208 that is secured to the rod 150. By moving the gripping unit 156, a gap x is formed between the original position of the gripping unit 156 and the new position of the gripping unit 156. When the tension is released from the rod tensioning unit 306, the gripping unit 156 moves down the distance x or a portion of the distance x based on the number of times the gripping unit 156 is rotated. When the rod tensioning unit lowers the tension, the gripping unit 156 moves the bearing surface, and the tension in the rod is reduced at a level relative to the distance x.

Figure 5:
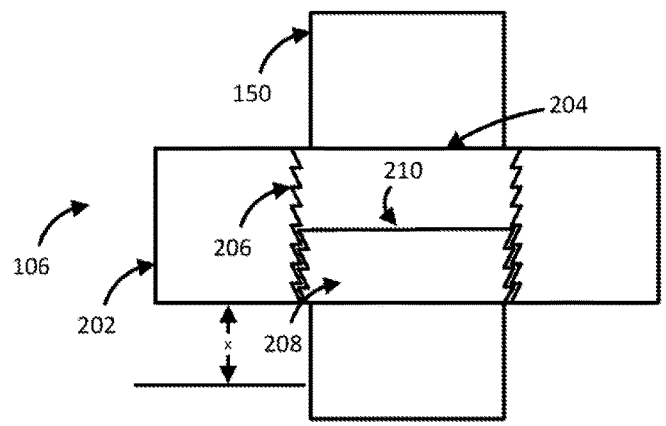
FIG. 5 depicts the gripping unit moved from an original position on the rod to a new position a distance x from the original position.

FIG. 5 depicts the gripping unit 156 moved from an original position on the rod 150 to a new position a distance x from the original position. The gripping unit 156 moves along the inner gripping unit 208 which remains stationary on the rod 150. In one embodiment, a camera is positioned on the chair frame 304 such that the camera transmits an image representing the position of the gripping unit 156. In another embodiment, a first camera is positioned on a side chair unit 304 to view a side view of the gripping unit 156, and a second camera is positioned on the top of the chair unit 304 to view a top view of the gripping unit 156.

Figure 6:
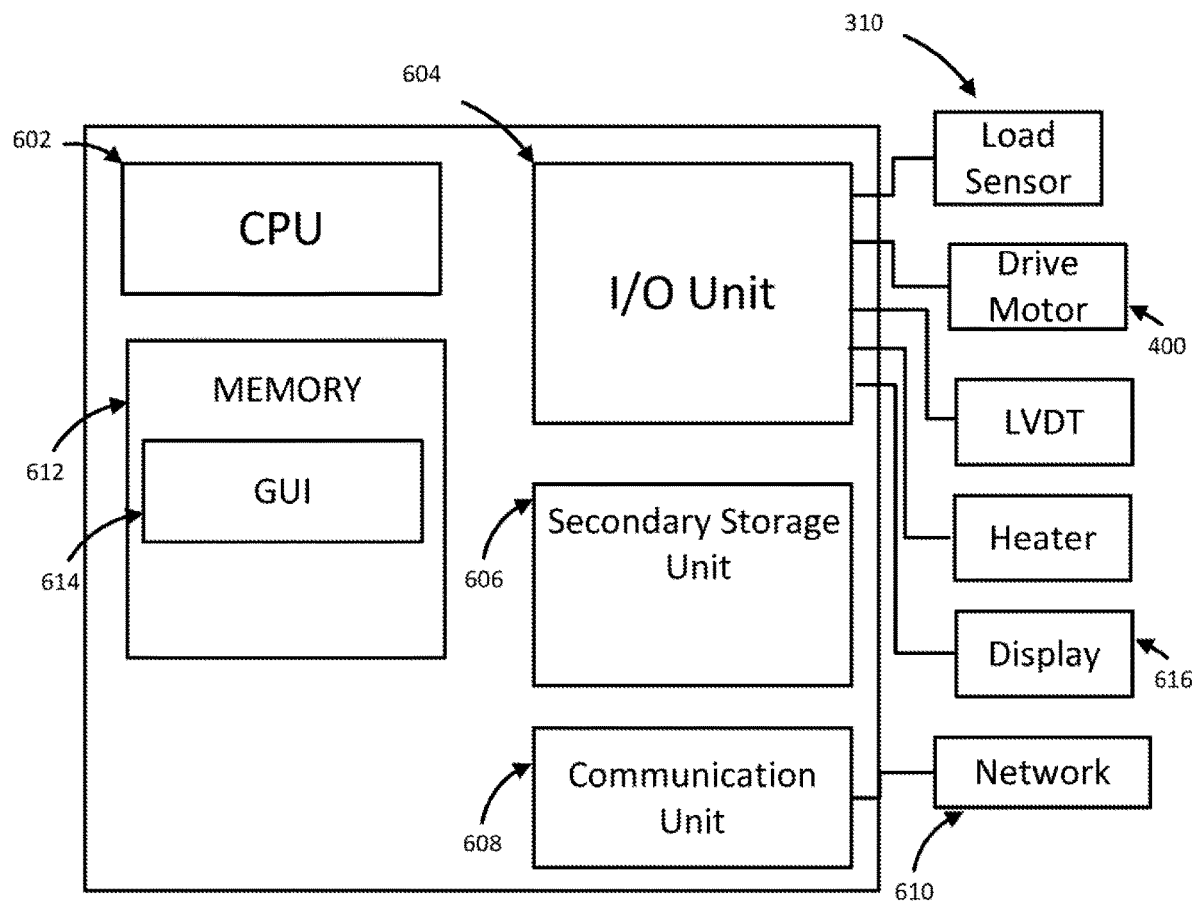
FIG. 6 depicts a rod de-tensioning control unit.

FIG. 6 depicts a rod de-tensioning control unit 600. The rod de-tensioning control unit 600 includes a central processing unit (CPU) 602, an input output (IO) unit 604 with the load sensor 310 connected to an input of the IO unit 604 and the drive unit 400 being connected to an output of the IO unit 604, a secondary storage device 606 that may include, a communication unit 608 communicatively coupled to a network 610, a memory 612. The rod de-tensioning control unit 600 may further comprise standard input devices such as a keyboard, a mouse, a digitizer, or a speech processing means (each not illustrated). Additional sensors including temperature sensors, linear vertical differential transmitters, pressure sensors, strain sensors and any other type of sensor may be connected to the IO unit 604. In one embodiment, video streams from image capture devices, such as a camera, are captured by the IO unit 604 for analysis to determine the amount of movement of the gripping unit 156. Consistent with this embodiment, a video analysis unit residing in the memory 612 may analyze frames extracted from the images sent from the cameras to determine when the gripping unit 156 is moved as well as the distance the gripping unit 156 is moved.

In one embodiment, the rod de-tensioning control unit 600's memory 612 includes a Graphical User Interface ("GUI") 614 that is used to gather information from a user via the display device 616 and I/O unit 604 as described herein. The GUI 614 includes any user interface capable of being displayed on a display device 616 including, but not limited to, a web page, a display panel in an executable program, or any other interface capable of being displayed on a computer screen. The GUI 614 may also be stored in the secondary storage unit 606. In one embodiment consistent with the present invention, the GUI 614 is displayed using commercially available hypertext markup language ("HTML") viewing software such as, but not limited to, Microsoft Internet Explorer, Google Chrome or any other commercially available HTML viewing software.

Figure 7:
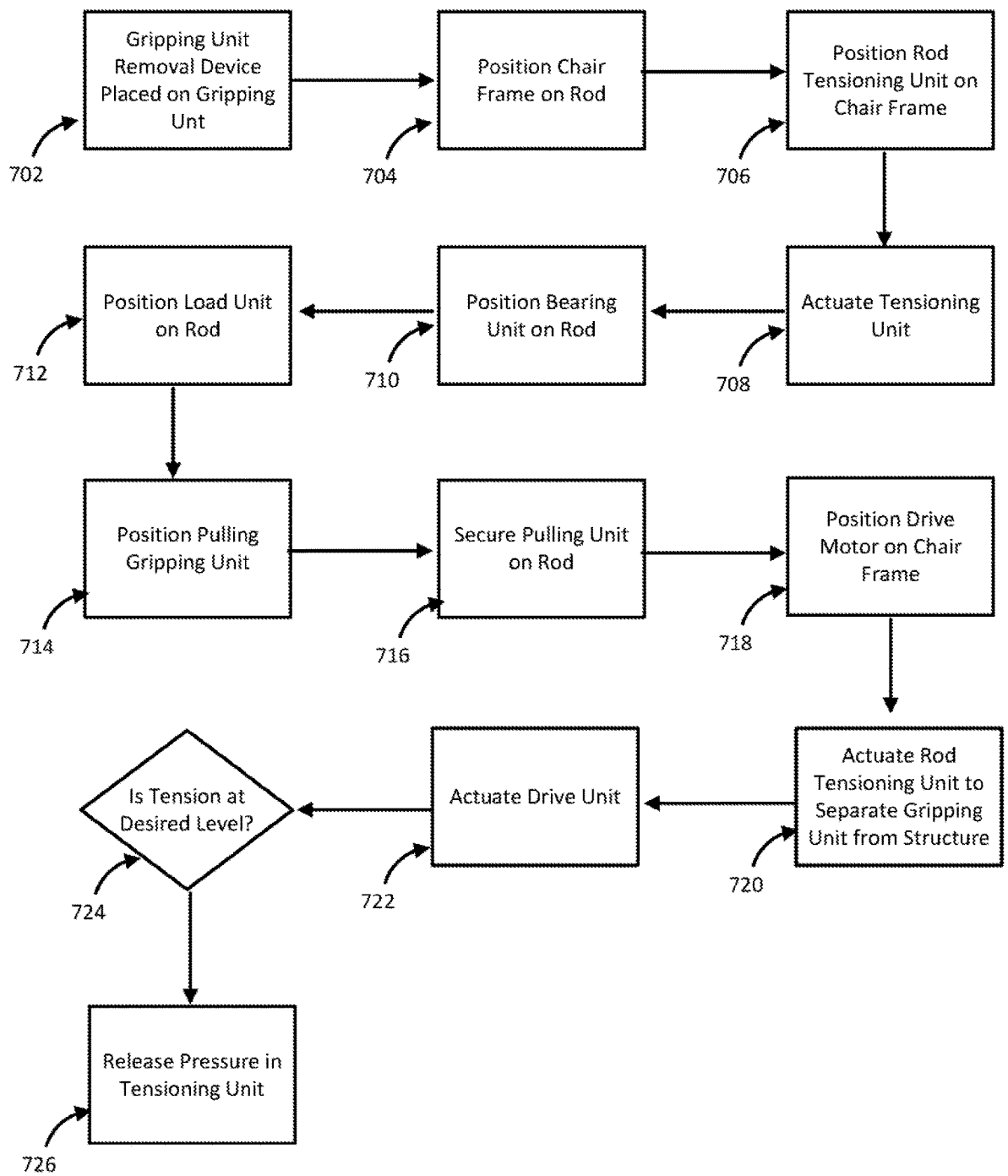
FIG. 7 depicts a schematic representation of the process of de-tensioning rods using the de-tensioning system.

FIG. 7 depicts a schematic representation of the process of de-tensioning rods using the de-tensioning system 300. In step 702, the gripping unit removal device 302 is placed on the gripping unit 156 such that an inner cavity of the gripping unit removal device 302 engages the gripping unit 156. In step 704, the chair frame 304 is slid over the rod 150 and placed onto the surface 154 such that the legs of the chair frame 304 are positioned around the periphery of the gripping unit 156. In step 706, the rod tensioning unit 306 is positioned on the rod 150 with a first end of the rod tensioning unit 306 being in contact with the top plate of the chair frame 304. In step 708, a small amount of hydraulic pressure is applied to the rod tensioning unit 306 to move the hydraulic to simplify the process of disassembling the system after use. to increase the tension in the rod 150. In step 710, the bearing plate 308 is positioned on the rod 150 on an end of the rod tensioning unit 306 that is furthest from the chair frame 304. In step 712, the load cell unit 310 is positioned on the rod 150 on the rod tensioning unit 306. In step 714, a pulling gripping unit 312 is positioned on the rod 150 on the load cell unit 310. In step 716, the pulling gripping unit 312 is secured to the rod 150.

In step 718, the drive unit 400 is secured to the chair frame 304 such that the engagement unit 404 of the drive unit 400 is positioned on the outer surface of the gripping unit removal device 302. In step 720, hydraulic pressure is applied to the rod tensioning unit 306 to separate the gripping unit 156 from the trunnion 140. In one embodiment, a camera unit is positioned on the chair frame 304 to determine when the gripping unit 156 has separated from the trunnion 140. In step 722, the drive unit 400 is actuated to rotate the gripping unit removal device 302 causing the gripping unit 156 to rotate along the threads of the inner gripping unit 208 such that the gripping unit 156 is moved a distance x from its initial position before the drive unit 400 actuated. In step 724, the drive motor 400 actuates until the tension in the rod 150 as measured by the theoretical distance required to reduce rod tension to the target level. In step 726, the hydraulic pressure on the rod tensioning device is released. The process of detention the rod 150 may be performed by the rod de-tensioning control unit 600.

Figure 8:
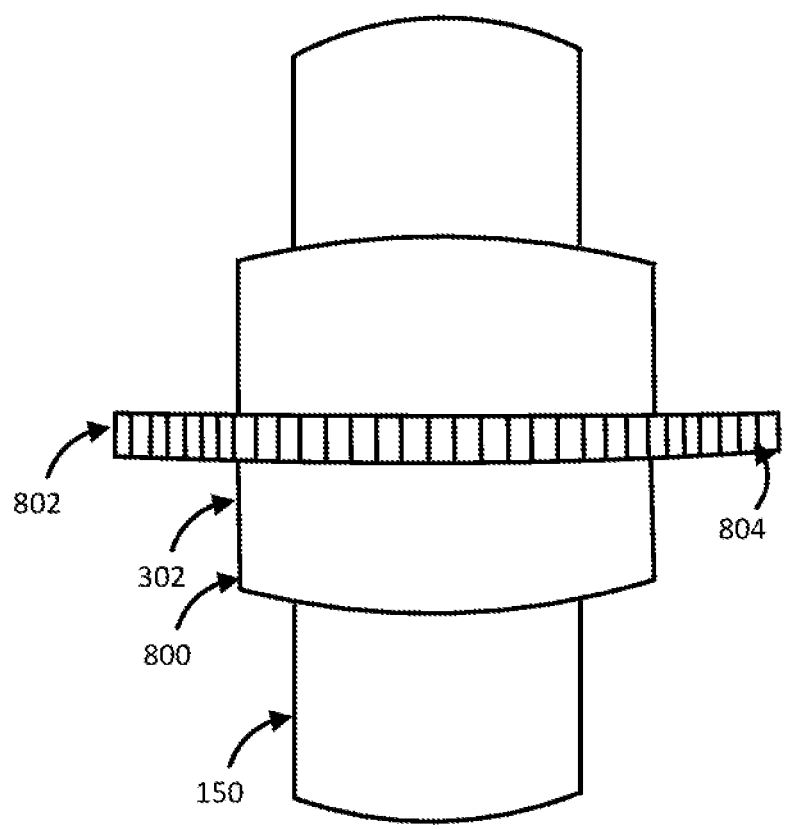
FIG. 8 depicts one embodiment of a gripping unit removal device.

FIG. 8 depicts one embodiment of a gripping unit removal device. The gripping unit removal device 302 includes a central shaft 800 including an opening sized to engage the gripping unit 156. A gear unit 802 is affixed around the periphery of the central shaft 800. The gear unit 802 includes a plurality of teeth 804 having a pitch and spacing that are sized to accommodate the engagement unit 404 on the drive unit 400 such that the drive unit 400 rotates the gripping unit removal device 302 to tighten and loosen the gripping unit 156. In one embodiment, the gear unit 802 is sized to accommodate the engagement unit 404 that has twenty-four teeth. In one embodiment, a heating unit (not shown) is placed on the gripping unit removal device 302 to warm the gripping unit removal device 302 before de tensioning occurs. In one embodiment, the heating unit is a heat tape wrapped around the gripping unit removal device 302.

Figure 9:
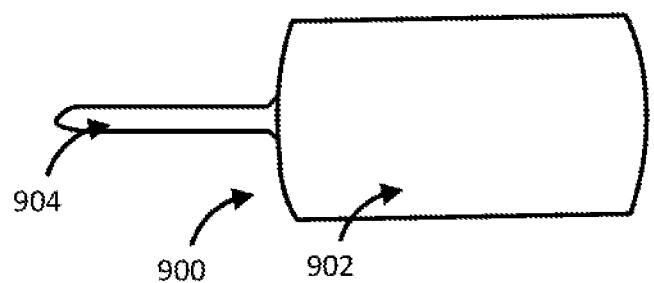
FIG. 9 depicts an arresting unit.

FIG. 9 depicts an arresting unit 900. The arresting unit 900 include a main portion 902 that includes a channel (not shown) with the channel sized to engage a rod 150. The arresting unit 900 includes a spacer 904 that extends from one side of the main portion 904. The spacer 904 is sized such that it can be inserted between the gripping unit removal device 302 and the rod 150 to apply a restricting force on the inner gripping unit 208 to restrain the inner gripping unit 208 from rotating around the rod 150 during the detensioning process.

In one embodiment, at least one linear vertical differential transmitter ("LVDT") unit is positioned on the gripping unit removal device 302 to determine the amount of movement made by the gripping unit removal device 302. The LVDT unit may have a rounded end that engages the gripping unit removal device 302. By measuring the distance the gripping unit 156 is moved from its initial position, the amount of tension to be removed from the rod 150 can be determined. If the amount of tension to be removed is less than the desired value, the gripping unit 156 may be moved an additional distance.

In the present disclosure, the words "a" or "an" are to be taken to include both the singular and the plural. Conversely, any reference to plural items shall, where appropriate, include the singular.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method of detensioning a rod, the method comprising:
    removably attaching a gripping unit removal device on a gripping unit where the gripping unit engages the rod;
    positioning a chair frame on the rod over a periphery of the gripping unit;
    positioning a rod tensioning unit on the rod with a first end of the rod tensioning unit being in contact with a surface of the chair frame;
    applying a first force to the rod tensioning unit;
    positioning a bearing plate on the rod in contact with the rod tensioning unit;
    positioning a load cell in contact with the rod on the rod tensioning unit;
    securing a drive unit to the chair frame such that a portion of the drive unit is in contact with the rod;
    applying a second pressure to the rod tensioning unit;
    actuating the drive unit;
    releasing the second pressure on the rod tensioning unit.

2. The method of claim 1 wherein the first pressure is sufficient to increase tension in the rod.

3. The method of claim 1 wherein the second pressure is sufficient to separate the gripping unit from a trunnion.

4. The method of claim 1 wherein the driving unit includes an engagement portion that is in contact with the rod.

5. The method of claim 3 wherein the drive unit actuates to move the gripping unit a predetermined distance from the trunnion.

6. The method of claim 1 wherein the drive unit is hydraulically driven.

7. The method of claim 1 wherein a central control unit is communicatively coupled to the drive unit.

8. The method of claim 7 wherein a plurality of cameras is optically connected to the central control unit.

9. The method of claim 8 wherein at least one of a plurality of cameras is positioned to capture an image of a side of the gripping unit.

10. The method of claim 1 wherein the first pressure is less than the second pressure.

* * * * *